Sept. 20, 1966  J. N. KIEFER  3,273,881
WELDING CRUTCH

Filed Nov. 19, 1963  2 Sheets-Sheet 1

Jeffrey N. Kiefer
INVENTOR.

BY *Clarence A. O'Brien*
*and Harvey B. Jacobson*
Attorneys

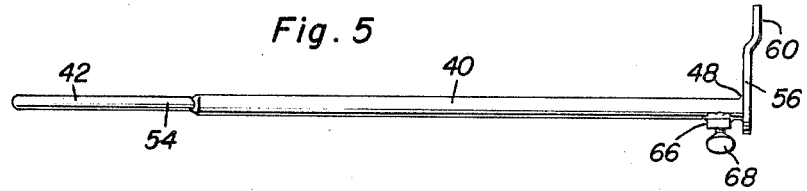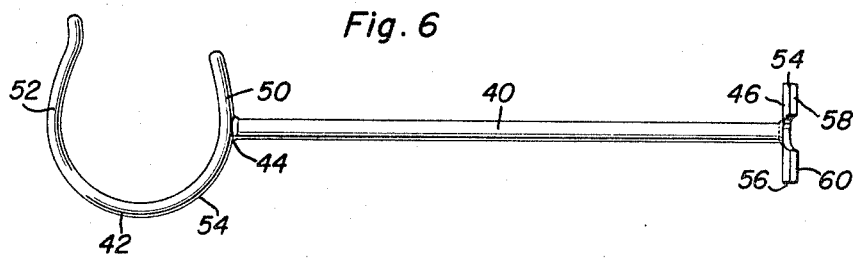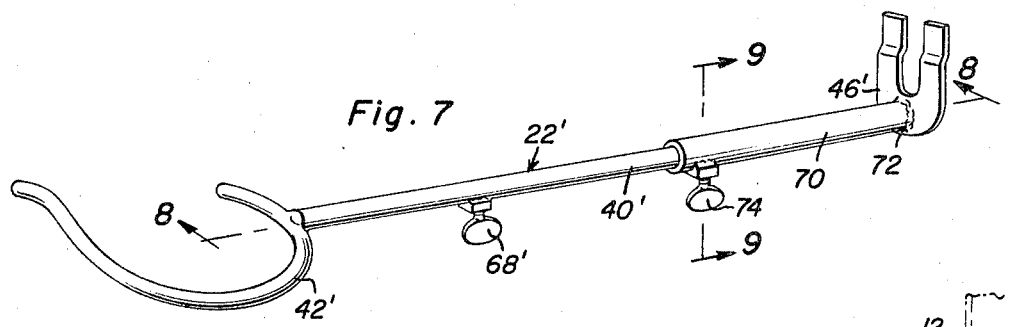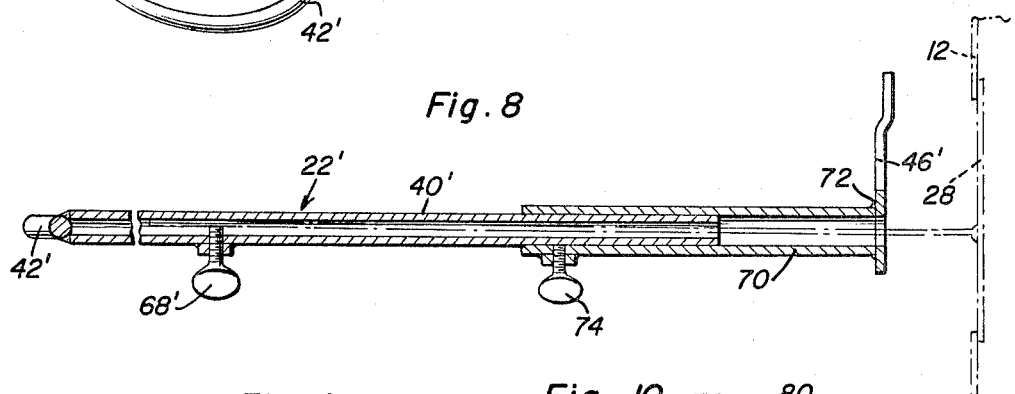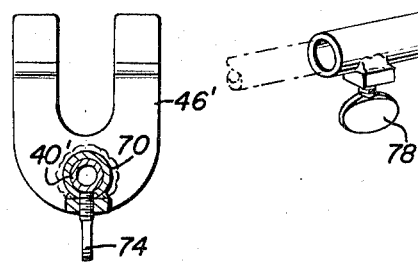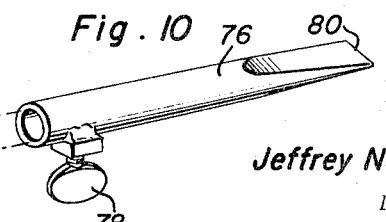

United States Patent Office 3,273,881
Patented Sept. 20, 1966

3,273,881
WELDING CRUTCH
Jeffrey N. Kiefer, 1836 Da Cola Shores Road,
Conesus, N.Y.
Filed Nov. 19, 1963, Ser. No. 324,612
10 Claims. (Cl. 269—321)

This invention relates to a novel and useful welding crutch and more specifically to a tool designed primarily for the purpose of assisting a body repairman.

In many instances it is necessary to repair holes in vehicle body panels by inserting a patching plate through the hole and securing it to the edge of the hole after the patching plate has been pulled into tight frictional engagement with the back side of the holed sheet metal panel.

Inasmuch as welding and brazing usually require both hands of a workman, one to hold the torch and the other to hold the fusing metal rod, it is almost a necessity that a second person be present and provided with some type of tool to hold the patching plate into tight frictional engagement with the remote surface of the holed sheet metal body panel until such time as the body repairman has at least "tacked" the patching plate over the hole in the sheet metal body panel. Consequently, it may be seen that in most instances the task of securing a patching plate to the back side of a holed sheet metal body panel requires the efforts of two body men. Since this is the case considerable time is lost on the part of both body repairman, the man attempting to do the job having to spend time to go to and ask a fellow workman to assist him and the time required by the assistant to perform his menial task.

It is therefor the main object of this invention to provide an apparatus which will enable body repairman to secure a patching plate over the remote side of a holed sheet metal body panel without requiring the assistance of another workman.

A further object of this invention, in accordance with the immediately preceding object, is to provide an apparatus which may be manipulated by either the arms or legs of the body repairman in a manner leaving his hands free to manipulate the torch and brazing or welding rod.

Still another object of this invention is to provide a tool in accordance with the preceding objects which may also be utilized by a workman to apply pressure on an exterior patch being welded or brazed to a sheet metal body panel.

A final object of this invention to be specifically enumerated herein is to provide a tool in accordance with the preceding objects which will conform to conventional forms of manufacture, be of simple consttruction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a side elevational view of the welding crutch;

FIGURE 6 is a top plan view of the welding crutch;

FIGURE 7 is an enlarged fragmentary perspective view of a modified form of welding crutch;

FIGURE 8 is an enlarged longitudinal vertical sectional view taken substantially upon the plane indicated by the section line 8—8 of FIGURE 7 and with parts of the mounting crutch being broken away;

FIGURE 9 is an enlarged transverse vertical sectional view taken substantially upon the plane indicated by the section line 9—9 of FIGURE 7; and FIGURE 10 is a perspective view of an interchangeable chisel head attachment adapted to be used in conjunction with the modified form of welding crutch.

Figure 1:
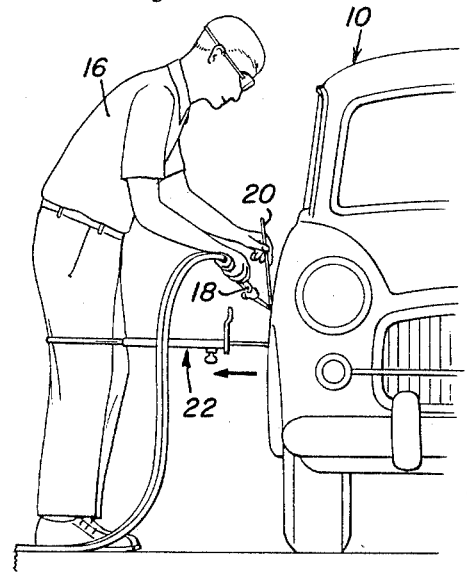
FIGURE 1 is a view in elevation of a workman using the welding crutch of the instant invention while in a standing position and with the crutch engaged with the upper portion of the right leg of the workman and being utilized to exert an outward pull on a patching plate disposed beyond a holed body panel of a motor vehicle.
Figure 4:
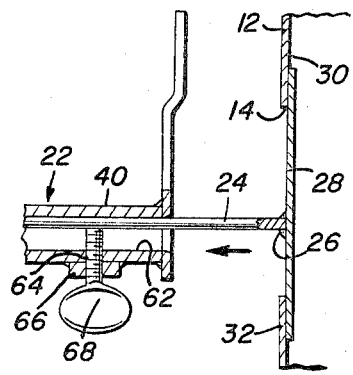
FIGURE 4 is a fragmentary enlarged longitudinal vertical sectional view of one end portion of the welding crutch of the instant invention showing the manner in which it is being utilized to hold a patching plate against the back side of a holed body panel of the motor vehicle illustrated in FIGURE 1.

Referring now more specifically to the drawings the numeral 10 generally designates a conventional form of motor vehicle including a door panel 12 which has a hole 14 therein. In FIGURE 1 of the drawings a workman 16 is shown holding a conventional form of torch 18 in his right hand and a welding or brazing rod 20 in his left hand. The welding crutch of the instant invention is generally designated by the reference numeral 22 and is engaged with the upper portion of the right leg of the workman 16. In addition, it will be seen in FIGURE 4 of the drawings, the welding crutch 22 is being utilized to support a length of welding rod 24 in a manner which will be discussed hereinafter. The free end of the welding rod 24 is secured by welding 26 to a patching plate 28 which has been inserted through the hole 14 and is being held against the remote surface 30 of the door panel 12 over the opening 14 by the application of axial thrust to the welding rod 24 away from the outer surface 32 of the panel 12.

Figure 2:
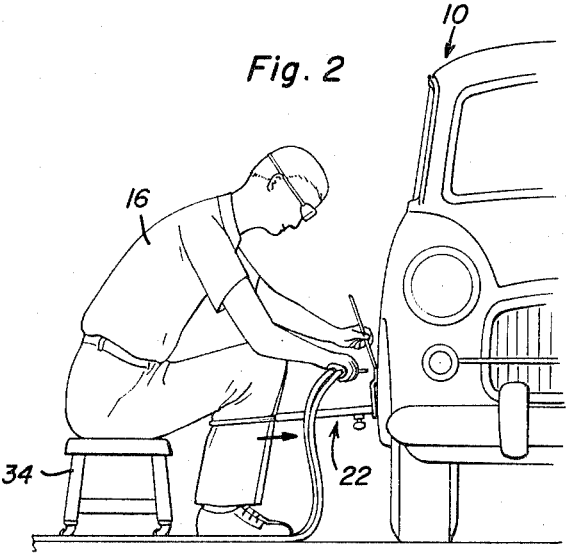
FIGURE 2 is a view in elevation of the workman shown with the tool engaged with the lower portion of his right leg and being utilized to exert a thrust against a patching plate being secured to the outer surface of a holed body panel.
Figure 3:
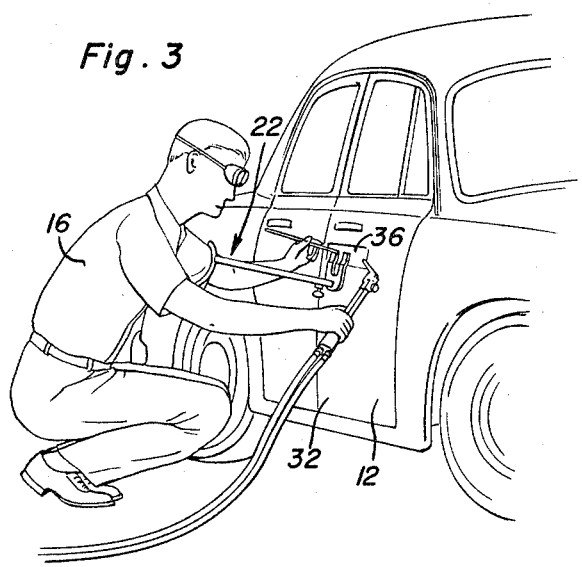
FIGURE 3 is a view in perspective of the workman using the welding crutch of the instant invention with the latter engaged by the upper portion of his left arm and being utilized to exert a thrust against an exterior patching plate being secured over a damaged body panel.

In FIGURE 2 of the drawings the workman 16 is shown seated on a stool 34 with the welding crutch 22 engaged with the lower portion of his right leg and being utilized to apply thrust on an exterior patching plate such as that illustrated in FIGURE 3 and designated by the reference numeral 36. In FIGURE 3 of the drawings the workman 16 has assumed a crouching position and the welding crutch 22 is engaged with the upper portion of the left arm of the workman and is being utilized to apply thrust to the exterior patching plate 36 so as to hold it in position in tight frictional engagement with the outer surface 32 of the panel 12.

With attention now directed more specifically to FIGURES 3-6 of the drawings it may be seen that the welding crutch comprises an elongated arm 40 having a generally U-shaped member 42 secured to one end in any convenient manner such as by welding 44 and a second U-shaped member 46 secured to its other end in any convenient manner such as by welding 48.

The U-shaped member 42 includes a pair of slightly curved legs 50 and 52 interconnected by means of a curved bight portion 54 and it may be seen that the medial plane of the U-shaped member 42 generally parallels the longitudinal centerline of the arm member 40.

The U-shaped member 46 is plate-like in nature and includes a pair of legs 54 and 56 whose free ends include laterally offset portions 58 and 60 respectively.

The arm member 40 is tubular and has a longitudinal bore 62 formed therethrough. In addition, the arm member 40 has an aperture 64 formed through one wall portion thereof and a threaded nut 66 is secured to the outer surface of the arm member in any convenient manner and is aligned with the aperture 64. A setscrew 68 is provided and threadedly engaged through the nut 66 and projects into the bore 62 for clampingly engaging a section of the welding rod 24 between the inner end of the setscrew 68 and the surface of the bore 62 diametrically opposite the aperture 64. Accordingly, inasmuch as the section of welding rod 24 is snugly but slidably received within the bore 62, it will be noted that the welding rod 24 may be secured in adjusted position with varying lengths thereof projecting from the end of the arm member 40 remote from the U-shaped member 42. In this manner, the effective length of the arm member 40 may be varied when the welding rod 24 is welded as at 26 to the patching plate 28.

Accordingly, it may be seen from FIGURE 1 of the drawings that when the workman has the upper portion of his right leg received within the U-shaped member 42 that he may apply a slight pressure with his right leg in order to straighten the latter and to effect the desired outward pull on the patching plate 28 so that the latter may be tightly frictionally engaged with the inner surface 30 of the panel 12 about the opening or hole 14 until such time as he has been able to "tack" the patching plate 28 in position behind the panel 12 by means of the torch 18 and brazing or welding rod 20.

In FIGURES 2 and 3 of the drawings the workman 16 is applying thrust to the exterior patching plate 36 and holding it in place until it may be "tacked" over the outer surface 32 of the panel 12 about the opening or hole 14.

The modified form of welding crutch illustrated in FIGURES 7–9 is generally referred to by the reference numeral 22′ and includes the same structural features as the welding crutch 22 with the exception that the U-shaped member 46′ thereof is welded to an extension sleeve 70 as at 72, the extension sleeve 70 being telescoped over the end of the arm 40′ remote from the U-shaped member 42′.

The setscrew 68′ is spaced adjacent the end of the arm member 40′ to which the U-shaped member 42′ is secured and the sleeve 70 includes a setscrew 74 which is similar to setscrew 68 and is utilized to retain the sleeve 70 is adjusted position longitudinally of the arm 40′.

The tool or welding crutch 22′ has an advantage in that it may be used in the same manner in which the tool 22 is used and in addition may have the sleeve-type chisel head 76 secured thereto in lieu of the sleeve 70. The chisel head 76 also includes a setscrew which is referred to by the reference numeral 78 and includes a somewhat sharpened free end 80 which presents a smaller cross-sectional area of the welding crutch to the workpiece and thereby enables a given amount of thrust applied to the U-shaped member 42′ to be concentrated over a smaller area on the workpiece.

From the foregoing description it is believed readily apparent that the welding crutches 22 and 22′ may be advantageously utilized in many welding jobs to hold workpiece in position until it can be "tacked" in its proper position prior to completing the welding job.

The foregoing is considered as illustrative only of the principles of the invention. Further, since numerous modifications and changes will readily ocur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A welding crutch comprising an elongated arm including a laterally directed portion on one end adapted to be engaged by a portion of a worker's body such as his arm or leg for the purpose of applying axial thrust to said arm, said elongated arm including guide means adapted to support and slidingly engage a length of welding rod with said rod generally paralleling said arm and projecting outwardly beyond the other end of said arm, said elongated arm further including gripping means adapted to grip said rod and to prevent axial shifting of said rod relative to said arm, whereby the extended end of said rod, secured to a patching plate behind a hole in a piece of sheet metal or the like, may have axial thrust applied thereto through said arm to pull said patching plate into light frictional engagement with the rear surfaces of said piece of sheet metal while said workman utilizes his two hands to support a torch and a fusing metal rod to tack said patching plate to said piece of sheet metal to close said hole.

2. The combination of claim 1 wherein said guide means defines a longitudinal bore extending longitudinally of said arm of a diameter adapted to snugly but freely telescopically receive said rod.

3. The combination of claim 2 wherein said bore is formed longitudinally through said arm member.

4. The combination of claim 3 wherein gripping means comprises at least one setscrew threadedly engaged with said arm member and projecting into said bore for endwise abutting engagement with said rod.

5. The combination of claim 1 including abutment plate means, mounting means mounting said abutment plate means on said other end of said arm member with said plate means extending transversely of said arm member, said mounting means including means for adjustably laterally positioning said plate means longitudinally of said arm member.

6. The combination of claim 5 wherein said mounting means includes means for positioning said plate means outwardly of said other end of said arm member.

7. The combination of claim 1 including abutment plate means, mounting means mounting said abutment plate means on said other end of said arm member with said plate means extending transversely of said arm member, said mounting means including means for adjustably laterally positioning said plate means longitudinally of said arm member, said abutment plate mounting means comprising sleeve-defining means to one end of which said plate means is secured, the other end of said sleeve means being telescoped over said other end of said arm and including means releasably retaining said sleeve means in position on said arm.

8. The combination of claim 7 wherein said guide means defines a longitudinal bore extending longitudinally of said arm of a diameter adapted to snugly but freely telescopically receive said rod, said bore being formed longitudinally through said arm member.

9. The combination of claim 1 wherein said laterally directed portion comprises a generally U-shaped member disposed in a plane extending longitudinally of said arm and having said one end of said arm secured to the free end portion of one of the legs of said U-shaped member.

10. The combination of claim 1 including abutment sleeve means telescoped over said other end of said arm and including means releasably retaining said abutment sleeve means in position longitudinally of said arm with one end of said sleeve means projecting outwardly beyond said other end of said arm, said one end of said abutment sleeve means being closed and sharpened to a degree for concentrating axial thrust applied to said abutment sleeve means to a small area of a workpiece against which said one end of said sleeve means is being advanced.

References Cited by the Examiner

UNITED STATES PATENTS

| | | | |
|---|---|---|---|
| 2,186,641 | 1/1940 | Jones | 269—43 |
| 3,030,903 | 4/1962 | Morris | 269—43 X |

ROBERT C. RIORDON, *Primary Examiner.*

B. S. MOWRY, *Assistant Examiner.*